US011315062B2

(12) United States Patent
Baloch (10) Patent No.: US 11,315,062 B2
(45) Date of Patent: Apr. 26, 2022

(54) SYSTEM AND METHOD FOR AUTONOMOUS SERVICE OPERATION VALIDATION

(71) Applicant: General Electric Company, Schenectady, NY (US)

(72) Inventor: Ghulam Ali Baloch, Albany, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 696 days.

(21) Appl. No.: 15/268,205

(22) Filed: Sep. 16, 2016

(65) Prior Publication Data

US 2018/0082239 A1 Mar. 22, 2018

(51) Int. Cl.
| | | |
|---|---|---|
| *G06Q 10/06* | (2012.01) | |
| *G06Q 10/00* | (2012.01) | |
| *F03D 17/00* | (2016.01) | |

(52) U.S. Cl.
CPC ....... *G06Q 10/06395* (2013.01); *F03D 17/00* (2016.05); *G06Q 10/0633* (2013.01); *G06Q 10/06393* (2013.01); *G06Q 10/063114* (2013.01); *G06Q 10/20* (2013.01); *F05B 2260/80* (2013.01); *F05B 2260/83* (2013.01)

(58) Field of Classification Search
CPC .. F03D 17/00; F05B 2260/80; F05B 2260/83; G06Q 10/06311; G06Q 10/063114; G06Q 10/06316; G06Q 10/0633; G06Q 10/06393; G06Q 10/06395; G06Q 50/06; G06Q 10/20
See application file for complete search history.

(56) References Cited

U.S. PATENT DOCUMENTS

| | | | |
|---|---|---|---|
| 7,035,786 B1* | 4/2006 | Abu El Ata | G06F 17/10 703/2 |
| 7,716,077 B1 | 5/2010 | Mikurak | |
| 9,348,571 B2 | 5/2016 | Baloch et al. | |
| 2007/0043538 A1 | 2/2007 | Johnson et al. | |
| 2008/0208429 A1* | 8/2008 | Saravanapriyan | F01K 13/02 701/100 |
| 2009/0037302 A1* | 2/2009 | Schulz | G06Q 10/06 705/30 |
| 2010/0010883 A1 | 1/2010 | Nielsen et al. | |

(Continued)

FOREIGN PATENT DOCUMENTS

| | | |
|---|---|---|
| JP | 2003233420 A | 8/2003 |
| WO | 2011/143531 A2 | 11/2011 |
| WO | 2015181857 A1 | 12/2015 |

OTHER PUBLICATIONS

Ding, "Opportunistic maintenance for wind farms considering multi-level imperfect maintenance thresholds," 2012, Renewable Energy, vol. 45, pp. 175-182 (Year: 2012).*
International Search Report and Written Opinion issued in connection with corresponding PCT Application No. PCT/US2017/51732 dated Nov. 24, 2017.

(Continued)

*Primary Examiner* — Ivan R Goldberg
(74) *Attorney, Agent, or Firm* — Fletcher Yoder, P.C.

(57) ABSTRACT

The present approach relates to an automated approach for verifying sufficiency of and/or quality of a service operation performed on an asset by a field engineer. In one implementation the approach employs autonomous tests and/or compares performance of the serviced asset with that of comparable peers operating in similar or co-local environments.

20 Claims, 3 Drawing Sheets

(56) References Cited

U.S. PATENT DOCUMENTS

| | | | |
|---|---|---|---|
| 2010/0268849 A1* | 10/2010 | Bengtson | G05B 23/0237 |
| | | | 709/248 |
| 2011/0270577 A1* | 11/2011 | Mihok | F03D 7/048 |
| | | | 702/188 |
| 2012/0041716 A1 | 2/2012 | Higginbotham et al. | |
| 2013/0073223 A1* | 3/2013 | Lapira | F03D 7/048 |
| | | | 702/34 |
| 2013/0021131 A1 | 12/2013 | Tucker et al. | |
| 2016/0055077 A1 | 2/2016 | Baloch et al. | |
| 2016/0146707 A1* | 5/2016 | Citriniti | G06Q 10/06 |
| | | | 702/183 |
| 2016/0203445 A1* | 7/2016 | Honsinger | F01K 13/02 |
| | | | 701/100 |

OTHER PUBLICATIONS

Baldoni, Matteo, et al.; "Verifying Protocol Conformance for Logic-Based Communicating Agents", Springer-Verlag Berlin Heidelberg, pp. 196-212, 2005.

Liou et al.; "Riser Integrity Management", Det Norske Veritas, pp. 15 of 66, http://rules.dnvgl.com/docs/pdf/DNV/codes/docs/2008-04/RP-F206.pdf, Apr. 2008.

Cevallos, Fabian; "State of Good Repair Performance Measures: Assessing Asset Condition, Age, and Performance Data", National Centre for Transit Research, http://www.nctr.usf.edu/2014/05/state-of-good-repair-performance-measures-assessing-asset-condition-age-and-performance-data/, 2016.

Japanese Notice of Allowance for JP Application No. 2019-512874, dated Sep. 16, 2021, 3 pgs.

\* cited by examiner

SYSTEM AND METHOD FOR AUTONOMOUS SERVICE OPERATION VALIDATION

BACKGROUND

The subject matter disclosed herein relates to the servicing and repair of field assets including large-scale assets used in power generation and/or transmission, other utility applications, transportation, production of materials or goods, and so forth.

For a variety of large-scale assets using in utilities, manufacturing, mining and resource production, transportation, and so forth, a given asset may be in a fixed or constrained location, and thus must be serviced or maintained at that location. Examples of such assets may include, but are not limited to, turbines used in power generation (e.g., wind turbines, steam turbines, gas turbines, hydroelectric turbines, and so forth), electricity transportation or storage infrastructure, water transportation infrastructure, rail systems, automated or semi-automated manufacturing equipment (e.g., mobile or fixed placement robots), oil and gas pumping equipment or separators, and so forth. Due to the localized nature of such assets, routine or on-call servicing of a given asset may be performed by a field engineer who travels on-site to perform a repair or service operation.

In conventional approaches, when a field engineer performs service on an asset, the service completion and quality are determined at the discretion of the field engineer. Post service, the field engineer may perform tests to verify that the service is successful and asset is functioning normally. These tests are typically not exhaustive. Furthermore, the interpretation of the certain test result may be at least partly subjective, and thus biased by a given technician's expertise, technical background, personal mode, and so on. As a result, it is not uncommon for the asset to require service for the same symptoms repeatedly and/or for the asset's productivity to be sub-optimal.

BRIEF DESCRIPTION

In one embodiment, a method is provided for validating a service operation performed on a device. In accordance with this method, a service completion indication is received at a device upon completion of a service operation to the device. In response to the service completion indication, validation of the service operation is requested by a validation agent executing on or in communication with the device. An expected performance metric is calculated based on one or more performance models for the device. One or more actual performance metrics for the device are generated after receipt of the service completion indication. A notification that the service is complete is generated if the actual performance metrics are within a specified threshold of the expected performance metrics. If the actual performance metrics are not within the specified threshold, a list of comparison devices is requested from a look-up agent. Based on the list of comparison devices, comparison performance metrics are requested from each listed comparison device. The actual performance metrics are compared to the comparison performance metrics. Based on the comparison of the actual performance metrics to the comparison performance metrics, a notification is generated that the service operation is either satisfactory or not satisfactory.

In a further embodiment, a device configured to be serviced on-site is provided. The device includes a processor component and a data storage or memory storing processor executable routines. The routines, when invoked and executed by the processor, implement one or both of an interface agent and validation agent, which alone or in combination: receive a service completion indication upon completion of a service operation to the device; in response to the service completion indication, calculate an expected performance metric based on one or more performance models for the device; generate one or more actual performance metrics for the device after receipt of the service completion indication; generate a notification that the service is complete if the actual performance metrics are within a specified threshold of the expected performance metrics; if the actual performance metrics are not within the specified threshold, request a list of comparison devices from a look-up agent; based on the list of comparison devices, request comparison performance metrics from each listed comparison device; compare the actual performance metrics to the comparison performance metrics; and based on the comparison of the actual performance metrics to the comparison performance metrics, generate a notification that the service operation is either satisfactory or not satisfactory.

In an additional embodiment, a method is provided for validating a service operation performed on a device. In accordance with this method, in response to an indication that a service operation is completed on the device, one or more comparison devices are automatically identified based on one or more criteria. One or more comparison performance metrics are automatically acquired from the one or more comparison devices. The one or more comparison performance metrics are compared to actual performance metrics generated after receipt of the indication that the service operation is completed. Based on the comparison of the actual performance metrics to the comparison performance metrics, a notification is generated that the service operation is either satisfactory or not satisfactory.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

The present discussion relates to an automated approach for verifying sufficiency of and/or quality of a service operation performed on an asset by a field engineer. In one implementation the approach employs autonomous tests and/or compares performance of the serviced asset with that of its peers operating in similar or co-local environments. The present approach, therefore, addresses issues for evaluating sufficiency of a service operation that are related to subjective human errors and variability.

Figure 1:
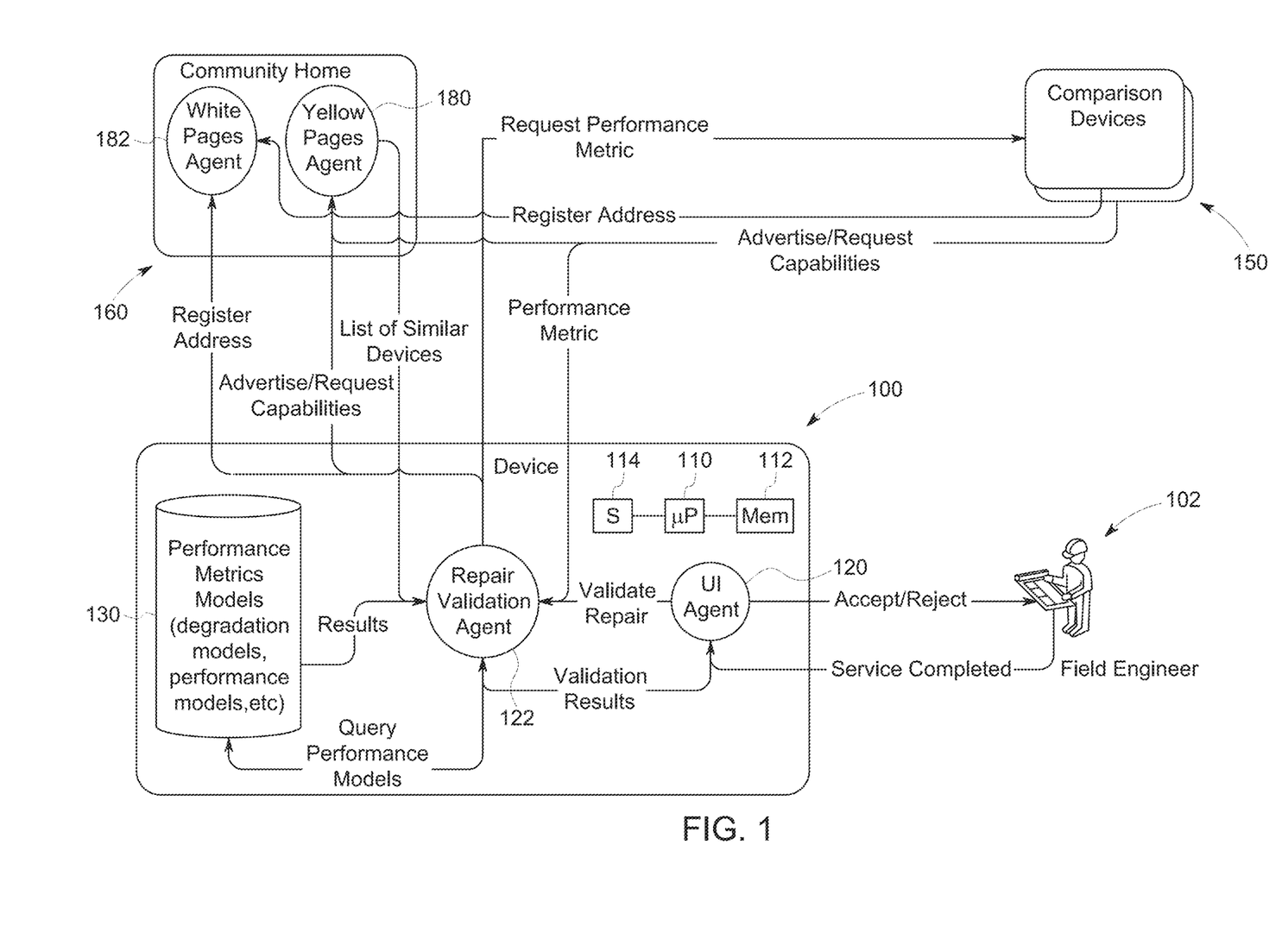
FIG. 1 schematically depicts aspects of a service site and validation scheme, in accordance with aspects of the present disclosure.

By way of example, and turning to FIG. 1, an asset (here depicted as device 100) is configured to autonomously evaluate the sufficiency or quality of a service operation. By way of example, the asset 100 may be a member of a group or set of industrial assets of comparable or identical designs, including such industrial assets operating in close proximity to one another or otherwise in the same or comparable environmental conditions. Such assets may be fixed or mobile, so long as mobility is constrained to an area having the same or comparable environmental conditions. Example of assets or devices on which the present approach may be implemented include assets or devices for which a field engineer 102 is typically dispatched to the site of the asset for repair or service operations, and thus may include assets that are fixed in place or localized to operation within a limited area (e.g., a warehouse, production site, and so forth) or which are otherwise serviced on-site. These assets may include, but are not limited to wind turbines (such as may be present at a wind farm site) and/or other power generation turbine systems (such as co-located hydro, gas, or steam turbines, mobile or stationary warehouse or manufacturing robots, devices or equipment at a solar energy farm, and/or homogeneous devices working on a factory floor.

In the depicted example, the device 100 includes one or more microprocessor components 110, a memory 112 or other data storage structure configured to store data used or generated by the processor 110 and/or models or routine executed or implemented by the processor 110, and one or more sensors 114 configured to generate sensed measurements that may be used in evaluation the performance or operation of the device 100 when running. Though the processor 110, memory 112, and sensors 114 are all depicted as being internal to or integral with the device 100 in the example of FIG. 1, in other implementations one or more of these components may be external or extrinsic to the device 100, such as remotely in communication with the device 100 or coupled to the device 100 for the purpose of servicing the device or evaluation a service operation.

In the depicted example, various agents may be implemented on or in communication with the device 100 (such as via stored routines executed on a processor 110, application specific integrated circuitry, and so forth) to facilitate interaction with the field engineer 102 and validation of a service operation. For example, in one implementation an agent-oriented architecture is employed as a basis for the organization and communication of the agent aspects. Processor or circuitry-implemented agents may, when running or invoked (either by a user or automatically), act with some degree of autonomy with respect to performing programmed or configured tasks without direct control or interaction by a user and may invoke other tasks (such as communication with other devices or data stores, acquisition of sensor data, operation of the device 100, and so forth) needed to complete the role attributed to a given agent, such as service validation.

By way of example, the depicted implementation shown in FIG. 1 includes a user interface (UI) agent 120 and a repair validation agent 122 implemented on or in communication with the device 100, such as via stored routines executed on the processor 110. In this example, the UI agent may facilitate interactions with a field engineer 102 who is performing or has performed a service operation on the device 100. For example, the UI agent 120 may be configured to receive an indication from the field engineer 102 when a service operation is completed. Based on feedback received from the repair validation agent 122, the UI agent 120 may also provide an indication to the field engineer 102 as to whether the service operation was successful or not (i.e., accepted or rejected), and thus whether the service operation may be characterized as completed or must be performed again. By way of example, in one implementation, once the field engineer 102 performs a requested service, the field engineer 102 connects to the device 100 through a handled user interface, which interacts with a UI Agent 120 residing on the device 100.

With respect to the repair validation agent, in the depicted example this agent may receive a request to validate a repair (or other service operation) from the UI agent 120 when a service operation is reported as being completed by the field engineer 102. In response to this request, and using logic and processes discussed in greater detail with respect to FIGS. 2 and 3, the repair validation agent 122 may perform an analysis as to whether the repair or service operation is sufficient and, based on this analysis, may provide validation results to the UI agent 120, which in turn may indicate to the field engineer 102 whether the service has been validated (and thus may be marked complete) or has not been validated (in which case the service operation may be performed again or an alternative service performed).

As discussed herein, as part of determining sufficiency of a validation operation, the repair validation agent 122 may access various resources, including data from one or more sensors 114 configured to monitor operational parameters of the device 100, one or more performance evaluation metrics or models 130 (e.g., suitable for modeling performance of the device 100 and/or of generating performance metrics for the device 100, and/or performance data or metrics from one or more other devices 150 (e.g., comparison or neighboring devices). With respect to possible sensing modalities, such sensors may be device specific and may be characterized as either being condition monitoring (e.g., environmental sensors, such as sensors for sensing or measuring temperature, humidity, wind or wind speed, and so forth) or performance monitoring (e.g., operational sensors measuring some operational or performance characteristic of the asset).

In the depicted example, the performance metrics or models 130 are stored on the device 100, such as in memory 112 and executable by processor 110. In practice, however, such models 130 may be accessed from a remote source as part of the validation process or from an external storage, including a storage device provided by the engineer 102 and connected to the device as part of the service operation.

Examples of performance evaluation metrics or models 103 that may be employed include, but are not limited to: degradation models over time, performance models over time, performance evaluation, and so forth. As will be appreciated, such performance evaluation models and metrics 130 may be dependent on the model of the device 100.

With respect to the other devices 150, in one implementation the devices 150 from which comparative performance data may be sought may be neighboring devices of the same or comparable type. Such devices 150 may be subject to comparable or identical local or environmental conditions, thus helping to account for such environmental factors with respect to device performance. For example, in the context of a wind farm where the device 100 is a wind turbine, other devices 150 may be other wind turbines of identical or comparable design and present at the wind farm or within a certain proximity (e.g., the closest 5, 10, or 15 turbines, all turbines within 1, 5, or 10 miles, and so forth). Thus performance of such other devices 150, in this neighboring or proximity context can effectively limit or eliminate performance differences attributable to variations in the local environment. Further, to the extent that only the same or comparable equipment model types are queries for performance metrics, performance differences related to device differences can also be limited or eliminated.

In addition, in the depicted example various types of agents are depicted to facilitate identifying and/or communicating with the other devices 150. In this example, the repair validation agent 122 queries one or more look-up agents for an asset or device community 160 (here depicted as part of a community home) to which the population of devices of interest belong. Thus, such look-up agents may allow referencing and searching of devices in a local context (e.g., a wind farm, power plant, and so forth), a regional context, (e.g., state or multi-state area), a national context, an international context, and/or a global (e.g., including regions outside country bounds) context.

By way of example, a population of devices may be registered to one or more agents that allow different devices to be identified (e.g., "looked up") in various ways. For example, the device community 160 may include or be searchable via a "yellow pages agent" 180 provided as a software module or component that provides a database or datastore that organizes information based on category and/or capability (such as device capabilities, equipment type, location, and so forth). Thus, the yellow pages agent 180 may allow devices to be search and identified based on their functionality, capabilities, and so forth.

The device community 160 may also include or be searchable via a white pages agent 182 provided as a software module or component that provides a database or datastore that organizes information (in this case other devices at least of the types embodied by device 100 and other devices 150) based on title or other identification. Thus, in the present example, the white pages agent 182 can be searched by name or title for a particular device or devices, such as to return a communication address. The yellow pages agent 180 can instead be searched based on one or more defined functions, capabilities, and/or locations to return a list of one or more devices having the specified characteristics. Based on the returned list, the identified devices can then be located or communicated with via data retrieved from the white pages agent 182.

By way of example, in one implementation the white pages agent 182 and the yellow pages agent 180 are hosted on a community host server, which can be on the premises of the device 100 or within a virtualized or network context (e.g., within the "Cloud"). At boot up all devices 100, 150 within the device community are registered with the white pages agent 182 and the yellow pages agent 180. For example, devices 100, 150 may register their existence to the white pages agent 182 so as to be discoverable by other devices within the community. Devices 100, 150 register their capabilities and services they provide or are capable of providing with the yellow pages agent 180. In one such arrangement, devices talk to yellow pages agent 180, white pages agent 182, and with each other using a predicate logic based communication language, such as Agent Communication Language (ACL).

While separate and distinct white pages agents 182 and yellow pages agents 180 are shown and described with respect to FIG. 1, it should be understood that such distinction is made merely to facilitate and simplify explanation. It should be understood that the information contained in and functionality ascribed to the white pages agents 182 and yellow pages agents 180 may be contained in a single database or datastore (such as different tables of a relational database) or may otherwise be provided in a searchable format returning the specified lists of devices with contact information.

Figure 2:
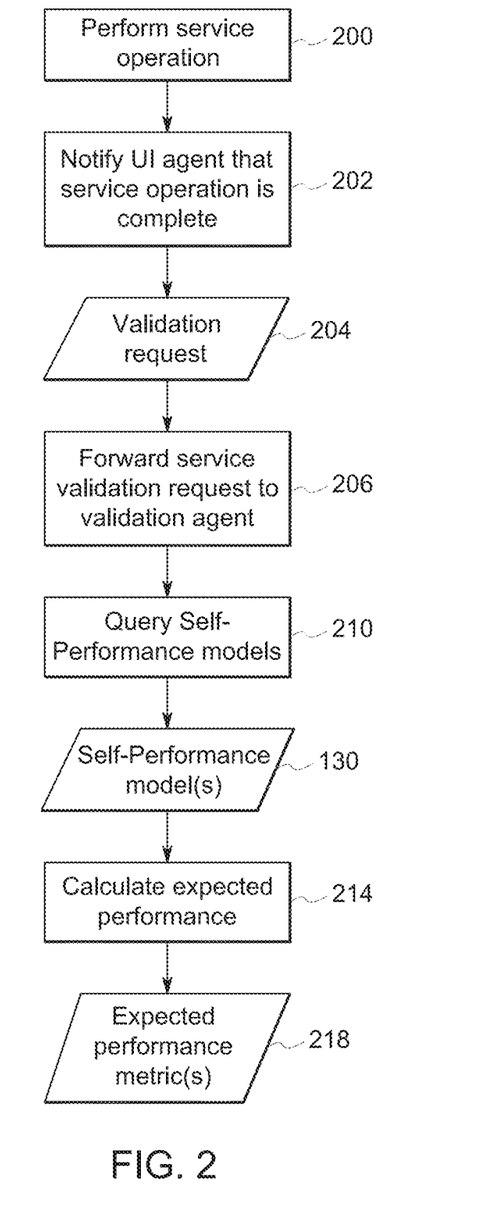
FIG. 2 depicts a process flow for performing a service operation and deriving expected performance metrics, in accordance with aspects of the present disclosure.
Figure 3:
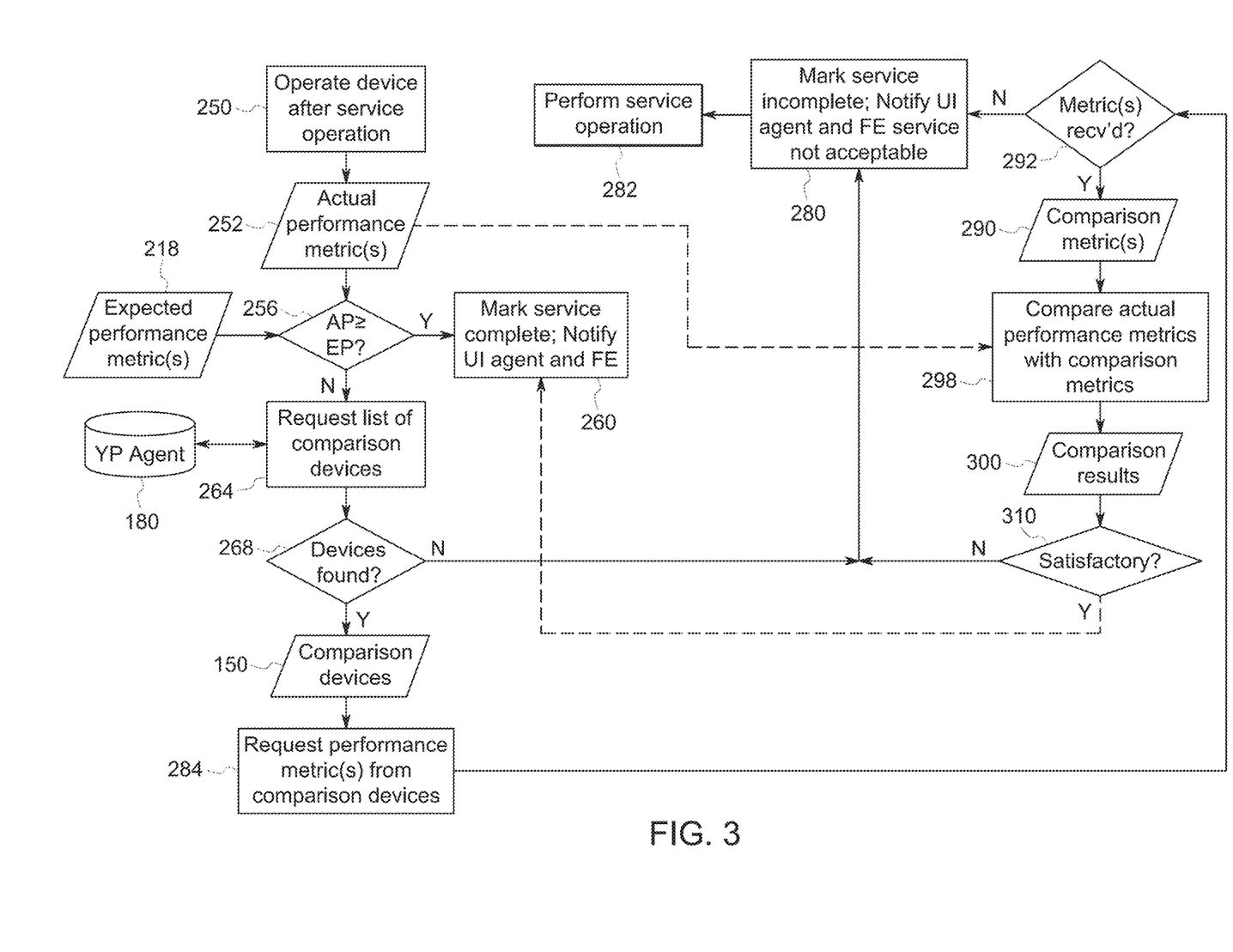
FIG. 3 depicts a process flow for validating a service operation, in accordance with aspects of the present disclosure.

With the preceding in mind, and turning to FIGS. 2 and 3, process flow diagrams depicting steps that may be employed as part of a validation process for validating a service operation are shown. Turning to FIG. 2, in this example a field engineer 102 (or other personnel) perform a service operation (block 200) on a device 100 undergoing repair or servicing. The field engineer 102 notifies (block 202) the UI agent 120 when the service operation is completed. The UI agent 120 in turn generates a validation request 204 that is forwarded (block 206) to the repair validation agent 122.

In the depicted example, upon receipt of the validation request 204, the repair validation agent 122 may query or otherwise access (block 210) one or more performance models stored or otherwise provided on the device 100 or accessible to the device 100. The repair validation agent 122 may then employ the performance models 130, which may take into account or be parameterized by various device-specific factors, location-specific factors, environment-specific factors, or other factors to calculate (block 214) one or more metrics 218 corresponding to an expected performance of the device 100 if the service operation was successful or sufficient. In one implementation, the repair validation agent 122 may also take into account performance data or metrics form neighboring or comparison devices 150 (discussed in greater detail with respect to FIG. 3) in calculating expected performance at step 214.

Turning to FIG. 3, as part of the validation routine the device 100 is operated (block 250) after the field engineer 102 indicates the service operation is completed. When the device 100 is operated, actual performance metrics 252 are acquired, such as with sensors 114 or by other suitable approaches for measuring performance of the device 100. If the actual performance metrics 252 meet or exceed the expected performance metrics 218, as determined at decision block 256, the service is indicated as completed (block 260), the UI agent 120 is notified and, correspondingly, provides a notification to the field engineer 102 that the service operation was successful.

Conversely, if the actual performance metrics do not meet or exceed the expected performance metrics, the repair validation agent 122 requests (block 264) a list of comparison devices 150 whose performance metrics may be useful in determining whether the actual performance metrics 252 of the service device 100 are consistent with a successful service operation. In the depicted example, the repair validation agent 122 may specify one or more factors or criteria (e.g., location, proximity, model or equipment type, age, and so forth) that may be searchable in a yellow pages agent 180 to generate a list of devices 150 will be useful for evaluating the performance of the serviced device 100. As will be appreciated from the discussion above, depending on the implementation a white pages agent 182 may also be queried, as needed, to acquire contact information for the comparison devices 150 so identified. Though in other implementations such information may be provided as part of the list of comparison devices 150.

By way of example, in one implementation the comparison devices 150 may be comparable devices (e.g., wind turbines, mobile robots, and so forth) at the same site (e.g., wind farm, warehouse, manufacturing site, and so forth), within a threshold distance (e.g., 1 mile, 5 miles, 10 miles, 50 miles, and so forth), situated in a comparable terrain (e.g., hilly terrain, plains, a valley, and so forth), or experiencing comparable weather or environmental conditions at that time. Likewise, comparison devices 150 may be identified or limited to be the same or a comparable model as the serviced device 100 (e.g., the same model, or a subsequent or prior model released within a threshold time frame, such as 1, 2, or 5 years. Similarly, comparison devices 150 may be identified as or limited to be devices of the same or comparable age as the serviced device 100 or having a similar service history. In this manner, comparison devices 150 may be selected to be a group of devices that allow performance variation due to environment, age, service, history, location, and so forth to be controlled for or eliminated, thus allowing the sufficiency of the current service operation to be better assessed.

As shown in the provided example, a determination (block 268) may be made as to whether any of the searchable devices meet the specified criteria, i.e., whether there are any comparison devices 150. If not, no further comparison is possible and the service is indicated as incomplete or unsatisfactory (block 280). The repair validation agent 122 indicates to the UI agent 120 that the service operation is not acceptable and the UI agent 120 provides a notification to the field engineer 102. The field engineer 102 may then re-perform the service operation or may perform an alternative operation to address the deficiency (block 282).

Conversely, if searchable devices meet the specified criteria, the identities of such comparison devices 150 are returned to the repair validation agent 122. Based on the returned list of devices 150, the repair validation agent 122 requests (block 284) comparison performance metrics 290 from the devices 150. In one implementation, devices 100, 150 communicate with each other using predicate logic based agent communication language.

If no comparison performance metrics 290 are returned (block 292), no further comparison is possible and the service is indicated as incomplete or unsatisfactory (block 280). The repair validation agent 122 indicates to the UI agent 120 that the service operation is not acceptable and the UI agent 120 provides a notification to the field engineer 102. The field engineer 102 may then re-perform the service operation or may perform an alternative operation to address the deficiency (block 282).

Conversely, if comparison performance metrics are returned to the repair validation agent 122, a comparison (block 298) is performed between the comparison performance metrics 290 and the actual performance metrics 252 to determine the sufficiency or acceptability of the service operation (block 310). By way of example, the results 300 of the comparison step 298 may be evaluated at block 310 to determine whether the actual performance metrics 252 meet or exceed the comparison metrics 290 or are within some specified tolerance threshold (e.g., within 1%, 2%, 5%; within 0.25 standard deviation (SD), 0.5 SD, 0.75 SD, and so forth).

If the comparison results 300 are deemed satisfactory, the repair validation agent 122 indicates that the service operation has been completed (block 260), the UI agent 120 is notified and, correspondingly, provides a notification to the field engineer 102 that the service operation was successful. Conversely, if the comparison results are not determined to be satisfactory, the repair validation agent 122 indicates to the UI agent 120 that the service operation is not acceptable and the UI agent 120 provides a notification to the field engineer 102. The field engineer 102 may then re-perform the service operation or may perform an alternative operation to address the deficiency (block 282).

Technical effects of the invention include implementation of an automated approach for verifying sufficiency of and/or quality of a service operation performed on an asset by a field engineer. In one implementation the approach employs autonomous tests and/or compares performance of the serviced asset with that of comparable peers operating in similar or co-local environments. The present approach, therefore, addresses issues for evaluating sufficiency of a service operation that are related to subjective human errors and variability.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for validating a service operation performed on a device, comprising:
   receiving, via a processor integral with the device, a service completion indication upon completion of a service operation to the device;
   in response to the service completion indication, initiating, via the processor, validation of the service operation;
   calculating, via the processor, expected performance metrics based on one or more performance models for the device;
   generating, via the processor, actual performance metrics for the device by operating the device after receipt of the service completion indication;
   in response to the actual performance metrics being within a specified threshold of the expected performance metrics, generating, via the processor, a completion notification that the service operation is complete; and
   in response to the actual performance metrics being outside the specified threshold:
      identifying, via the processor, a subset of comparison devices within a population of comparison devices that are comparable to the device by querying a look-up agent communicatively coupled to the processor;

based on the subset of comparison devices, requesting, via the processor, comparison performance metrics from each comparison device of the subset of comparison devices;

comparing, via the processor, the actual performance metrics to the comparison performance metrics; and based on the comparison of the actual performance metrics to the comparison performance metrics, generating, via the processor, a notification that the service operation is either satisfactory or not satisfactory.

2. The method of claim 1, wherein the service completion indication is received by an interface agent executing on the processor of the device, and wherein the interface agent generates a validation request and transmits the validation request to a validation agent of the processor to initiate validation of the service operation.

3. The method of claim 1, wherein the service completion indication is received by the processor of the device from a handheld device operated by a field engineer servicing the device.

4. The method of claim 1, wherein the processor of the device accesses the one or more performance models for the device from a storage on the device or in communication with the device.

5. The method of claim 1, wherein the one or more performance models comprise one or more of a degradation model over time, a performance model over time, or a model-specific performance model.

6. The method of claim 1, wherein the generating the actual performance metrics comprises operating the device and acquiring operation data from one or more sensors on the device.

7. The method of claim 1, wherein the specified threshold is that the actual performance metrics meet or exceed the expected performance metrics.

8. The method of claim 1, wherein the subset of comparison devices comprises devices meeting one or more specified criteria for at least one of device type, device function, device age, device location, environmental conditions, or proximity.

9. The method of claim 1, comprising, in response to no subset of comparison devices being returned, generating, via the processor, an incompletion notification that the service operation is incomplete.

10. The method of claim 1, comprising, in response to no subset of comparison performance metrics being returned, generating, via the processor, an incompletion notification that the service operation is incomplete.

11. The method of claim 1, wherein the device is an industrial asset, and wherein the processor is internal to the industrial asset.

12. The method of claim 1, comprising transmitting, via an interface agent of the processor, the notification that the service operation is either satisfactory or not satisfactory to a handheld device operated by a field engineer that performed the service operation to the device.

13. The method of claim 1, wherein the subset of comparison devices are identified as comparable in response to meeting one or more specified criteria comprising at least one of device type, device function, or device age.

14. A device configured to be serviced on-site, the device comprising:

a processor integral with the device; and a data storage or memory storing processor-executable routines which, when invoked and executed by the processor, implement one or both of an interface agent and validation agent, which alone or in combination:

receive a service completion indication upon completion of a service operation performed on the device;

in response to the service completion indication, calculate expected performance metrics based on one or more performance models for the device;

generate actual performance metrics for the device by operating the device after receipt of the service completion indication;

in response to the actual performance metrics being within a specified threshold of the expected performance metrics, generate a completion notification that the service is complete; and in response to the actual performance metrics being outside the specified threshold:

request a subset of comparison devices within a population of comparison devices that are comparable to the device via a look-up agent;

based on the subset of comparison devices, request comparison performance metrics from each comparison device of the subset of comparison devices;

compare the actual performance metrics to the comparison performance metrics; and based on the comparison of the actual performance metrics to the comparison performance metrics, generate a notification that the service operation is either satisfactory or not satisfactory.

15. The device of claim 14, wherein the interface agent generates a validation request in response to the service completion indication and transmits the validation request to the validation agent to request validation of the service operation.

16. The device of claim 14, wherein the validation agent accesses the one or more performance models for the device from a storage on the device or in communication with the device.

17. The device of claim 14, wherein the generating the actual performance metrics comprises operating the device and acquiring operation data from one or more sensors on the device.

18. A method for validating a service operation performed on an industrial asset, comprising:

in response to an indication that a service operation is completed on the industrial asset, identifying, via a processor integral with the industrial asset, a subset of comparison devices within a population of comparison devices that are comparable to the industrial asset based on one or more criteria;

acquiring, via the processor, one or more comparison performance metrics from the subset of comparison devices;

comparing, via the processor, the one or more comparison performance metrics to actual performance metrics generated after receipt of the indication that the service operation is completed; and based on the comparison of the actual performance metrics to the comparison performance metrics, generating, via the processor, a notification that the service operation is either satisfactory or not satisfactory.

19. The method of claim 18, wherein the one or more criteria for identifying the subset of comparison devices comprise one or more of industrial asset type, industrial asset function, or industrial asset age.

20. The method of claim 18, wherein the actual performance metrics are generated by operating the industrial asset and acquiring operation data using one or more sensors on the industrial asset.

* * * * *